United States Patent [19]

Furbish et al.

[11] 4,349,323
[45] Sep. 14, 1982

[54] APPARATUS FOR CONTINUOUSLY FEEDING POWDERS

[75] Inventors: William B. Furbish, Black Earth; Roscoe E. Baker, Verona, both of Wis.

[73] Assignee: Ray-O-Vac Corporation, Madison, Wis.

[21] Appl. No.: 229,967

[22] Filed: Jan. 30, 1981

[51] Int. Cl.³ .......................................... B29B 5/04
[52] U.S. Cl. ................................. 425/147; 264/105; 264/122; 264/127; 425/79; 425/225; 425/296; 425/363
[58] Field of Search ............... 264/122, 127, 211, 349, 264/109, 105, 76, 75, 425/79, 147, 225, 296–297, 363

[56] References Cited

U.S. PATENT DOCUMENTS

| | | | |
|---|---|---|---|
| 1,083,275 | 1/1914 | Eberhard | 264/75 |
| 2,534,291 | 12/1950 | Moss | 264/349 |
| 2,568,332 | 9/1951 | Genovese | 425/147 |
| 3,039,137 | 6/1962 | Smith et al. | 264/76 |
| 3,242,530 | 3/1966 | Hirsch et al. | 425/363 |
| 3,894,024 | 7/1975 | Cherenko et al. | 264/349 |
| 4,038,063 | 7/1977 | Williams et al. | 264/122 |
| 4,129,633 | 12/1978 | Biddick | 264/40.3 |
| 4,290,988 | 9/1981 | Nopper et al. | 264/122 |

OTHER PUBLICATIONS

Exhibit A—Prior Art Feed Device (Photograph).
Exhibit B—Partial Flow Chart Schematic of Exhibit A.

*Primary Examiner*—Jeffery R. Thurlow
*Attorney, Agent, or Firm*—Raymond J. Kenny; Edward A. Steen

[57] ABSTRACT

A hopper-feeder (10) especially suited for, but not limited to, continuously feeding self adhering powders to a subsequent processing step is disclosed. In particular, the apparatus includes a first hopper (12), an intermediate passageway (16), a second hopper (18) and a feed guide (20). A wiper (32), a bottle brush auger (34) and an associated auger cleaning rod (36) expedite powder flow. Shear blades (40), disposed within the second hopper (18), further break up any undesirable particles before exiting the apparatus (10).

5 Claims, 3 Drawing Figures

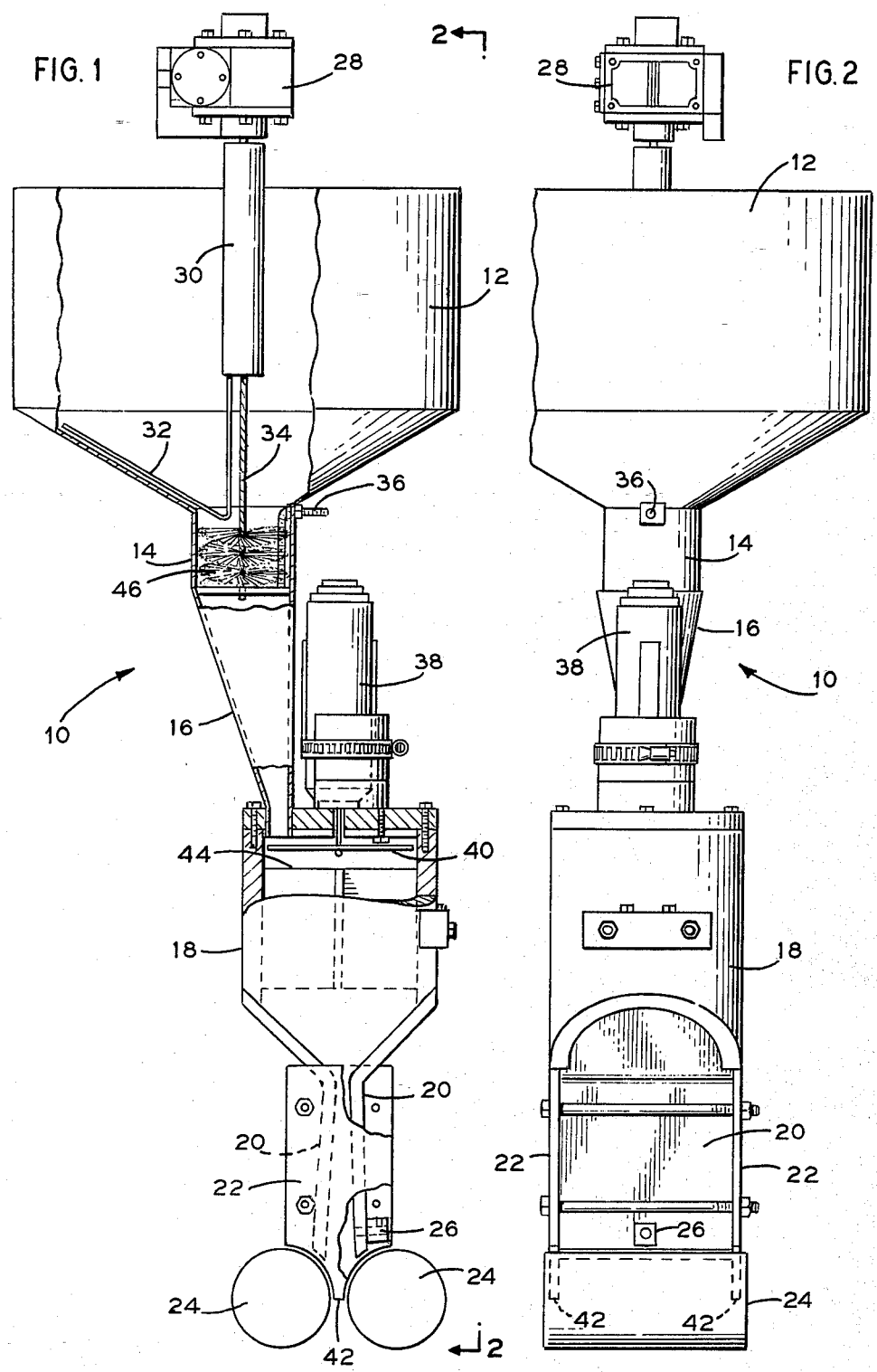

APPARATUS FOR CONTINUOUSLY FEEDING POWDERS

TECHNICAL FEEDER

This invention relates to the art of feeding powders in general and more particularly to an apparatus for feeding powders, with high self adhesion characteristics.

BACKGROUND ART

In the scheme of things, there are generally two types of powders; powders that exhibit good flowing characteristics and powders that can be best described as non-flowable types. It goes without saying that flowable powders are relatively easy to continuously transfer from one location to another. On the other hand, non-flowable powders are difficult to transfer.

In particular, we were faced with the problem of feeding a mixture of carbon and Teflon from a high speed intensifying mixer to a subsequent strip manufacturing step. (Teflon is a registered trademark of E. I. duPont deNemours and Company.)

The expression "flowable powder" is being used in a very broad sense. Powders do not really flow in a strict hydraulic sense but rather the particles constituting the powder slide and roll over each other; the particles being driven by an external force (gravity, a fluid, etc.). Accordingly, the "flow" characteristics of the powder, are dictated, in part, by the particles' self-adhesive properties. Obviously, particles having a relatively slippery or smooth (ex. ball bearings) external surface will exhibit better flowability characteristics than particles having a rough or sticky surface.

In our case, it is the Teflon constituent that causes the carbon/Teflon mixtre to exhibit extremely poor flowability characteristics. The mixture is a very light, fluffy and spongy material that tends to adhere to itself which creates clumps, thereby making a continuously flowing feeding process extremely difficult. Moreover, it is imperative that there be no agglomerates in the mixture, since the clumped material tends to precipitate undesirable holes in the manufactured sheet.

Accordingly, it was necessary to develop a feeding apparatus that could: (1) continuously feed a non-flowable powder to a subsequent manufacturing step and (2) simultaneously prevent particulate formation in the powder during the feeding process.

SUMMARY OF THE INVENTION

Accordingly, there is provided a powder feeding apparatus that prevents particulate formation during the feeding operation.

In brief, the apparatus includes a first or bulk powder hopper, a wiper and auger for feeding the powder from the hopper through a frustoconical type intermediate passageway to a second hopper or feed funnel. The funnel is equipped with high speed gear blades to break up any agglomerated powder particles that may have accumulated during any previous processing steps.

Means are provided to continuously clean the auger and prevent the formation of a vortex in the feed funnel. Moreover, a sensing device regulates the powder level in the apparatus.

BRIEF DESCRIPTION OF THE DRAWINGS

FIG. 1 is a partial cross-sectional side elevation of an embodiment of the invention.

FIG. 2 is a view taken along line 2—2 of FIG. 1.

PREFERRED MODE FOR CARRYING OUT THE INVENTION

Figure 3:
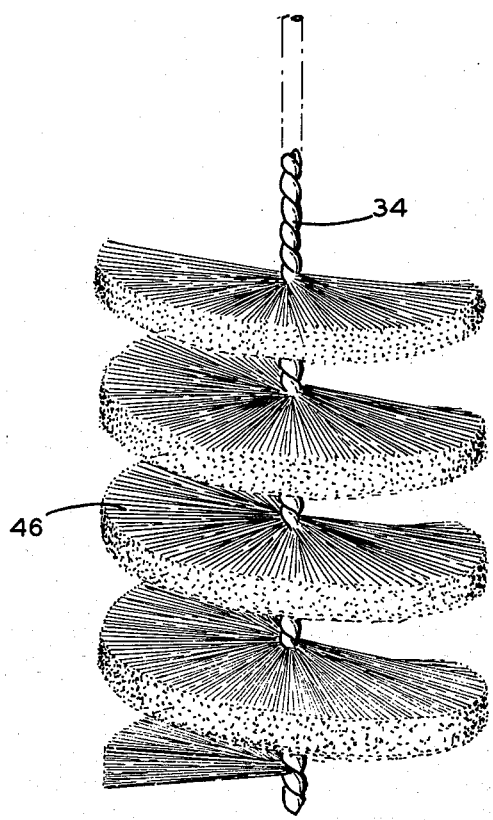
FIG. 3 is a view of a feature of the invention.

Referring to FIGS. 1 and 2, there is depicted a hopper feeder 10.

The feeder 10 includes a first or bulk powder hopper 12 having a truncated shape and a base 14. The base 14 extends into intermediate passageway 16. The passageway 16, in turn, is attached to second hopper or feed funnel 18. A feed guide 20 extends from the bottom of the funnel 18. Side plates 22 are arcuated at their base to form nips 42 to accommodate a pair of closely spaced rollers 24. Flow sensing means 26, such as an "electric eye", is attached to the guide 20 at a predetermined location.

A variable, low speed motor (or other drive means) 28 is disposed above the hopper 12. Shaft 30 rotatably extends from the motor 28 into the hopper 12.

Wiper arm 32 and auger 34 are affixed to the shaft 30. The arm 32 is shaped so as to lie just above the interior surface of the hopper 12. The auger 34 extends into the base 14.

Although any auger 34 may be utilized, a bottle brush having helical (or spiral) bristles 46 is most satisfactory. See FIG. 3. In combination therewith, auger brush cleaning rod 36 is disposed in the base 14 and placed in direct contact with the bristles 46 of the brush 34.

A variable, high speed motor 38 (or other drive means) is affixed to the upper portion of the funnel 18. A plurality of high speed shear blades 40, affixed to the shaft of the motor 38, are disposed within the funnel 18 and up towards the passageway 16. A semi-permanently mounted anti-vortex baffle 44 is positioned within the funnel 18 below the blades 40.

The invention and manner of applying it, may, perhaps, be better understood by a brief discussion of the principles underlying the invention.

As was discussed heretofore, the instant apparatus 10 was developed to overcome the problems associated with non-flowable powders, namely a combination of carbon and Teflon. Carbon/Teflon, when previously mixed in a high speed intensifying mixer is a light (about 10 lbs/ft$^3$ [160 kg/m$^3$]), fluffy powder with a tendency to form small agglomerations. This mixture which, in one instance, is utilized for the production of cathodes in zinc-air primary cells, cannot contain any aggregated material. Inasmuch as this particular composition is formed into relatively thin sheets by the combined actions of the nips 42 and the rollers 24, any particles remaining in the mixture will cause undesirable holes to form in the resulting flat sheet. Once formed, a hole will ultimately precipitate the tearing of the sheet, rendering it useless.

It should be emphasized, however, that the instant invention is not limited to carbon/Teflon applications or strip production. Rather, it may be utilized in any instance where a powder (flowable or non-flowable) must be fed to a subsequent manufacturing step.

The carbon/Teflon mixture, previously mixed to the desired consistency, is introduced into the hopper 12. The variable speed motor 28 rotates the shaft 30 at about thirty rpm. The wiper 32 slowly and continuously wipes the bottom of the hopper 12 to ensure even powder flow to the auger 34. Moreover, this sweeping action helps prevent the formation of clumps of powder within the hopper 12.

Due to the helical (spiral) nature of the brush 34 as well as the flexible nature of the bristles 46, the powder is smoothly and continuously fed into the funnel 18 via the passageway 16. A bottle brush is an excellent choice. Moreover, the auger 34 helps break up any particulate formation.

The rod 36 continuously cleans the bristles 46 as the brush 34 rotates. By continuously rubbing and flexing against the rod 36, the bristles 46 do not become clogged with the powder which would otherwise interfere with the feeding operation. Contrast this state-of-affairs with that exhibited by a standard metal screw auger. Since the material is so fluffy and clump-prone, it would quickly clump together about the screw auger. The particles would then quickly accumulate wherein the flow would be impeded thereby preventing powder discharge.

The powder, after passing through the passageway 16, is fed into the funnel 18 where it is impacted with the rapidly rotating (about 5000 rpm) blades 40. This high speed chopping action engendered by the blades 40 will tend to eliminate any remaining agglomerates so as to maintain constant powder density in the funnel 18. In order to further reduce the potential of clumping, the powder should be dumped towards the center of the blades 40. Powder reaching the central core area of the blades 40 will be subjected to the intense chopping action of the blades 40. On the other hand, if powder is allowed to strike the periphery of the blades 40, the resulting centrifugal forces will tend to cause the powder to miss the impact, and subsequent fluidization of the powder by the high speed blades, and enhance undesirable agglomeration formation.

The baffles 44 are positioned within the funnel 18 to simultaneously break up the vortex created by the high speed whirling blades 40 and aid in the distribution of the powder to the rollers 24. It is preferred to employ blades 40 having a thin wire type blade surface area to inhibit vortex formation in the funnel 18. As an example, if four blades are utilized, each blade should be approximately a sixteenth of an inch (0.16 centimeters) in diameter. The baffles 44, are semi-permanently mounted within the funnel 18 so that they may be mechanically rotated (and locked) to the most optimum position for vortex break up. This arrangement ensures an even powder flow to the rollers 24.

In the illustrated embodiment, the powder then passes through the feed guide 20 at the base of the funnel 18 towards the nips 42 and the rollers 24. By employing either a straight or slightly diverging (two or three degrees from the vertical) sidewall, the flow of powder is appreciably improved. The key here is to prevent compacting of the powder above the rollers 24 between the nips 42. A too wide divergence will lead to an uneven distribution of the powder resulting in undesirable agglomeration formation. If the weight of the powder above the nips of the rolls is allowed to become excessive, the material will tend to clump and form agglomerates.

The sensing device 26 regulates the level of the powder in the funnel 18. Should the apparatus get overloaded, that is, if the powder is being fed into the guide

20 too rapidly, the sensor 26 shuts off the motor 28. The wiper 32 and auger 34 cease turning, thereby stopping the flow of powder to the funnel 18. The blades 40 (via motor 38) remain rotating, however, to ensure the continued integrity of the powder remaining in the hopper 18 and the passageway 16 (if any).

After the sensor 26 again detects the proper powder level in the guide 20, the motor 28 is reenergized to continue the feeding of the powder.

Ultimately, and as an example of one of the uses of the invention, the non-agglomerated powder is fed between the rollers 24, where, in conjunction with the nips 42, the powder is rolled into a compacted, narrow sheet. The sheet is then subsequently processed by a method and apparatus not contemplated by the instant invention.

The choice of materials selected in the construction of the apparatus 10 is a merely function of the powder employed. In reality, any type of construction material is satisfactory. It should be emphasized, however, that components experiencing relatively high stress (e.g., the shear blades 40) should be metallic. Moreover, the cleaning rod 36, inasmuch as it is continuously cleaning the rotating auger 34, should be constructed from a sturdy material, such as stainless steel.

While in accordance with the provisions of the statutes, there is illustrated and described herein specific embodiments of the invention, those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follows:

1. An apparatus for continuously feeding powders, the apparatus comprising a first hopper having a base, a second hopper disposed below the first hopper, a passageway connecting the base to the second hopper, a feed guide disposed below the second hopper and registered thereto, a wiper disposed within the first hopper, a bottle brush auger disposed within the base, means for rotating the wiper and the auger, a plurality of thin blades disposed within the second hopper and in close proximity with the passageway, means for rotating the blades, a distribution baffle disposed within the second hopper, and sensing means for regulating the quantity of powder in the second hopper.

2. The apparatus according to claim 1 wherein the the brush includes bristles arranged in a helical fashion.

3. The apparatus according to claim 2 wherein a brush cleaning rod is registered against the bristles of the brush.

4. The apparatus according to claim 1 wherein the guide includes a pair of nips disposed at the base of the guide and a pair of rollers disposed below the guide to form a flat sheet of powder as the powder passes through the rollers.

5. The apparatus according to claim 1 wherein the blades are made from wire.

* * * * *